US011777971B2

(12) United States Patent
Meshi et al.

(10) Patent No.: US 11,777,971 B2
(45) Date of Patent: *Oct. 3, 2023

(54) BIND SHELL ATTACK DETECTION

(71) Applicant: Palo Alto Networks (Israel Analytics) Ltd., Tel Aviv (IL)

(72) Inventors: Yinnon Meshi, Kibbutz Revivim (IL); Idan Amit, Ramat Gan (IL); Eyal Firstenberg, Ramat HaSharon (IL); Jonathan Allon, Haifa (IL); Yaron Neuman, Zoran (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 124 days.

This patent is subject to a terminal disclaimer.

(21) Appl. No.: 17/175,720

(22) Filed: Feb. 15, 2021

(65) Prior Publication Data

US 2021/0168163 A1    Jun. 3, 2021

Related U.S. Application Data

(63) Continuation of application No. 15/950,234, filed on Apr. 11, 2018, now Pat. No. 10,999,304.

(51) Int. Cl.
*H04L 9/40* (2022.01)
(52) U.S. Cl.
CPC ........ *H04L 63/1425* (2013.01); *H04L 63/145* (2013.01); *H04L 63/1416* (2013.01); *H04L 63/1466* (2013.01); *H04L 63/20* (2013.01)
(58) Field of Classification Search
CPC ............. H04L 63/1425; H04L 63/1416; H04L 63/145; H04L 63/1466; H04L 63/20
See application file for complete search history.

(56) References Cited

U.S. PATENT DOCUMENTS

| 6,704,874 B1 | 3/2004 | Porras et al. |
| 7,003,790 B1 | 2/2006 | Inoue et al. |
| 7,007,301 B2 | 2/2006 | Crosbie et al. |

(Continued)

FOREIGN PATENT DOCUMENTS

CN    103561048 A    2/2014

OTHER PUBLICATIONS

N. Brownlee et al. Traffic Flow Measurement: Architecture. Request for Comments 2722. Oct. 1999. (Year: 1999).*

(Continued)

*Primary Examiner* — Robert B Leung
(74) *Attorney, Agent, or Firm* — KLIGLER & ASSOCIATES PATENT ATTORNEYS LTD

(57) ABSTRACT

Methods, apparatus and computer program products implement embodiments of the present invention that include collecting data packets transmitted between multiple entities over a network, and grouping the packets at least according to their source and destination entities and their times, into connections to which the packets belong. Pairs of the connections are identified having identical source and destination entities and times that are together within a specified time window, and sets of features are generated for the identified pairs of the connections. The features in the pairs are evaluated in order to detect a given pair of connections indicating malicious activity, and an alert is generated for the malicious activity.

20 Claims, 4 Drawing Sheets

(56) References Cited

U.S. PATENT DOCUMENTS

| | | | |
|---|---|---|---|
| 7,684,568 B2 | 3/2010 | Yonge, III et al. | |
| 8,578,345 B1 | 11/2013 | Kennedy et al. | |
| 8,769,681 B1* | 7/2014 | Michels | H04L 63/1458 |
| | | | 713/193 |
| 9,118,582 B1 | 8/2015 | Martini | |
| 9,319,421 B2 | 4/2016 | Ferragut et al. | |
| 9,531,736 B1 | 12/2016 | Torres et al. | |
| 9,690,933 B1 | 6/2017 | Singh et al. | |
| 9,773,112 B1 | 9/2017 | Rathor et al. | |
| 10,140,453 B1 | 11/2018 | Fridakis | |
| 10,237,875 B1* | 3/2019 | Romanov | H04L 47/32 |
| 10,706,144 B1 | 7/2020 | Moritz et al. | |
| 2002/0059078 A1 | 5/2002 | Valdes et al. | |
| 2002/0133586 A1* | 9/2002 | Shanklin | H04L 43/06 |
| | | | 709/224 |
| 2003/0133443 A1* | 7/2003 | Klinker | H04L 65/1101 |
| | | | 370/353 |
| 2005/0015624 A1 | 1/2005 | Ginter et al. | |
| 2005/0060295 A1* | 3/2005 | Gould | H04L 63/1425 |
| 2005/0069130 A1 | 3/2005 | Kobayashi | |
| 2005/0071330 A1 | 3/2005 | Douceur et al. | |
| 2005/0123138 A1 | 6/2005 | Abe et al. | |
| 2005/0183120 A1 | 8/2005 | Jain et al. | |
| 2005/0262556 A1 | 11/2005 | Waisman et al. | |
| 2005/0286423 A1* | 12/2005 | Poletto | H04L 41/0893 |
| | | | 370/235 |
| 2006/0137009 A1* | 6/2006 | Chesla | G06F 21/552 |
| | | | 726/22 |
| 2006/0156398 A1 | 7/2006 | Ross et al. | |
| 2006/0190803 A1 | 8/2006 | Kawasaki et al. | |
| 2007/0011319 A1 | 1/2007 | McClure et al. | |
| 2007/0073519 A1 | 3/2007 | Long | |
| 2007/0116277 A1 | 5/2007 | Ro et al. | |
| 2007/0124474 A1 | 5/2007 | Margulis | |
| 2007/0201691 A1 | 8/2007 | Kumagaya | |
| 2007/0201693 A1 | 8/2007 | Ohno | |
| 2008/0013725 A1 | 1/2008 | Kobayashi | |
| 2008/0244097 A1 | 10/2008 | Candelore et al. | |
| 2008/0262991 A1* | 10/2008 | Kapoor | H04L 63/1441 |
| | | | 706/20 |
| 2009/0265777 A1 | 10/2009 | Scott | |
| 2010/0014594 A1 | 1/2010 | Beheydt et al. | |
| 2010/0146292 A1 | 6/2010 | Shi et al. | |
| 2010/0146293 A1 | 6/2010 | Shi et al. | |
| 2010/0146501 A1 | 6/2010 | Wyatt et al. | |
| 2010/0272257 A1 | 10/2010 | Beals | |
| 2010/0284282 A1* | 11/2010 | Golic | H04L 63/1425 |
| | | | 370/242 |
| 2011/0135090 A1 | 6/2011 | Chan et al. | |
| 2011/0138463 A1* | 6/2011 | Kim | H04L 63/1458 |
| | | | 726/22 |
| 2011/0271343 A1 | 11/2011 | Kim et al. | |
| 2011/0317770 A1 | 12/2011 | Lehtiniemi et al. | |
| 2012/0240185 A1* | 9/2012 | Kapoor | H04L 41/0866 |
| | | | 726/1 |
| 2012/0308008 A1 | 12/2012 | Kondareddy et al. | |
| 2013/0061045 A1 | 3/2013 | Kiefer et al. | |
| 2014/0010367 A1 | 1/2014 | Wang | |
| 2014/0198669 A1 | 7/2014 | Brown et al. | |
| 2014/0201776 A1 | 7/2014 | Minemura et al. | |
| 2015/0026810 A1 | 1/2015 | Friedrichs et al. | |
| 2015/0156270 A1 | 6/2015 | Teraoka et al. | |
| 2015/0180883 A1 | 6/2015 | Aktas et al. | |
| 2015/0295903 A1 | 10/2015 | Yi et al. | |
| 2015/0341380 A1* | 11/2015 | Heo | H04L 63/1425 |
| | | | 726/22 |
| 2015/0341389 A1* | 11/2015 | Kurakami | H04L 63/1425 |
| | | | 726/1 |
| 2016/0119292 A1 | 4/2016 | Kaseda et al. | |
| 2016/0142746 A1 | 5/2016 | Schuberth | |
| 2016/0359895 A1 | 12/2016 | Chiu et al. | |
| 2017/0026387 A1 | 1/2017 | Vissamsetty et al. | |
| 2017/0078312 A1* | 3/2017 | Yamada | H04L 63/1416 |
| 2017/0171229 A1 | 6/2017 | Arzi et al. | |
| 2017/0294112 A1 | 10/2017 | Kushnir | |
| 2017/0374090 A1* | 12/2017 | McGrew | H04L 41/16 |
| 2018/0007013 A1 | 1/2018 | Wang | |
| 2018/0048662 A1 | 2/2018 | Jang et al. | |
| 2018/0077189 A1* | 3/2018 | Doppke | H04L 63/20 |
| 2018/0288081 A1* | 10/2018 | Yermakov | H04L 63/1458 |
| 2019/0068620 A1 | 2/2019 | Avrahami et al. | |
| 2019/0207966 A1 | 7/2019 | Vashisht et al. | |
| 2019/0297097 A1 | 9/2019 | Gong et al. | |
| 2020/0082296 A1 | 3/2020 | Fly et al. | |
| 2020/0162494 A1 | 5/2020 | Rostami-Hesarsorkh | |
| 2020/0195673 A1 | 6/2020 | Lee | |
| 2020/0274894 A1 | 8/2020 | Argoeti et al. | |
| 2020/0285737 A1 | 9/2020 | Kraus et al. | |
| 2020/0293917 A1 | 9/2020 | Wang et al. | |
| 2020/0327221 A1 | 10/2020 | Street | |
| 2020/0374301 A1 | 11/2020 | Manevich et al. | |
| 2021/0004458 A1 | 1/2021 | Edwards et al. | |
| 2021/0182387 A1 | 6/2021 | Zhu et al. | |
| 2021/0224676 A1 | 7/2021 | Arzani et al. | |

OTHER PUBLICATIONS

Skormin, V. A. Anomaly-Based Intrusion Detection Systems Utilizing System Call Data, Mar. 1, 2012. (Year: 2012).*
International Application # PCT/IB2021/058621 Search Report dated Dec. 14, 2021.
U.S. Appl. No. 16/261,634 Office Action dated Sep. 8, 2021.
Xu, "Correlation Analysis of Intrusion Alerts," Dissertation in Computer Science submitted to the Graduate Faculty, North Carolina State University, pp. 1-206, year 2006.
U.S. Appl. No. 17/038,285 Office Action dated Mar. 21, 2022.
U.S. Appl. No. 17/506,713 Office Action dated Nov. 8, 2022.
International Application # PCT/IB2022/059544 Search Report dated Jan. 20, 2023.
International Application # PCT/IB2022/060920 Search Report dated Feb. 7, 2023.
EP Application # 19832439.4 Office Action dated Mar. 1, 2023.
International Application # PCT/IB2022/061926 Search Report dated Mar. 27, 2023.
U.S. Appl. No. 17/700,579 Office Action dated Mar. 23, 2023.
U.S. Appl. No. 17/464,716 Office Action dated Apr. 14, 2023.
U.S. Appl. No. 17/464,709 Office Action dated Apr. 14, 2023.
U.S. Appl. No. 17/571,558 Office Action dated Jun. 26, 2023.

* cited by examiner

BIND SHELL ATTACK DETECTION

CROSS-REFERENCE TO RELATED APPLICATIONS

This application is a continuation of U.S. patent application Ser. No. 15/950,234, filed Apr. 11, 2018, which is incorporated herein by reference.

FIELD OF THE INVENTION

The present invention relates generally to computer systems and networks, and particularly to detecting a bind shell attack on a computer in a network.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including collecting data packets transmitted between multiple entities over a network, grouping the packets at least according to their source and destination entities and their times, into connections to which the packets belong, identifying pairs of the connections having identical source and destination entities and times that are together within a specified time window, generating sets of features for the identified pairs of the connections, evaluating, by a processor, the features in the pairs in order to detect a given pair of connections indicating malicious activity, and generating an alert for the malicious activity.

In one embodiment, the malicious activity includes a bind shell attack. In some embodiments, evaluating the features includes determining a baseline of the features, and comparing the features in the pairs of connections to the baseline of the features.

In additional embodiments, each given pair of connections includes first and second connections, and wherein each of the features are selected from a list consisting of respective ports used during the first and the second connections, respective start times of the first and the second connections, respective end times of the first and the second connections, respective durations of the first and the second connections, respective volumes of the first and the second connections, respective reverse volumes of the first and the second connections, a source IP address for the first and the second connections, a destination IP address for the first and the second connections and a protocol for the first and the second connections. In one embodiment, detecting the malicious activity includes detecting that the first and the second ports are different for the given pair of connections.

In further embodiments, each given pair of connections includes first and second connections, wherein a given feature includes a difference between respective start times of the first and the second connections. In supplemental embodiments, each given pair of connections includes first and second connections, wherein a given feature includes a difference between an end time of the first connection and a start time of the second connection. In another embodiment, each given pair of connections includes first and second connections, wherein a given feature includes a volume of data transmitted from the source entity to the destination entity during the first connection divided by a volume of data transmitted from the destination entity to the source entity during the first connection.

In some embodiments, each given pair of connections includes first and second connections, wherein evaluating the features includes applying a plurality rules to the features, and wherein detecting the given pair of connections indicating malicious activity includes detecting that at least a predetermined number of the rules vote true. In a first embodiment, a given rule votes false if a duration of the second connection is less than a small value, if a volume of data transmitted in the second connection is less than a negligible value, and wherein the given rule votes true otherwise. In a second embodiment, a given rule votes true if a volume of data transmitted in the first connection is less than a small value, and wherein the given rule votes false otherwise.

In a third embodiment, a given rule votes true if a difference between a start time of the first connection and a start time of the second connection is greater than a negligible value and less than a minimal value, and wherein the given rule votes false otherwise. In a fourth embodiment, a given rule votes true if a difference between an end time of the first connection and a start time of the second connection is a negligible value that can be positive or negative, and wherein the given rule votes false otherwise. In a fifth embodiment, a given rule votes true if a protocol used for the first connection is in a specified set of protocols, and wherein the given rule votes false otherwise.

In a sixth embodiment, a given rule votes true if a protocol used for the second connection is either unknown or is in a specified set of protocols, and wherein the given rule votes false otherwise. In a seventh embodiment, a given rule votes false if a count of distinct IP addresses of the entities that communicated with ports used during the first and the second connections is greater than a small value, and wherein the given rule votes true otherwise. In an eighth embodiment, a given rule votes false if, for a given pair of connections including a given destination entity, a count of unique source entities that accessed the given destination entity using a first given port during the first connection and a second given port during the second connection is greater than a high value, and wherein the given rule votes true otherwise.

In some embodiments, each given pair of connections includes first and second connections, wherein evaluating the features includes applying, to the features, a plurality of noise detectors including respective entries, wherein the noise detector votes false if the features from the given pair of connections are in accordance with one of the entries, wherein the given noise detector votes true otherwise, and wherein detecting the given pair of connections indicating malicious activity includes detecting that at least a predetermined number of the noise detectors vote true.

In one embodiment, each of the entries includes a specified internet protocol (IP) address for the destination entity, and a specified port number on the destination entity used by the first connection. In another embodiment, each of the entries also includes a second specified port number on the destination entity used by the second connection. In a further embodiment, each of the entries includes a specified internet protocol (IP) address for the source entity and a specified port on the destination entity used by the first connection.

There is also provided, in accordance with an embodiment of the present invention an apparatus, including a probe configured to collect data packets transmitted between multiple entities over a network, and at least one processor configured to group the collected packets at least according to their source and destination entities and their times, into connections to which the packets belong, to identify pairs of the connections having identical source and destination entities and times that are together within a specified time window, to generate sets of features for the identified pairs of the connections, to evaluate the features of the pairs in order to detect a given pair of connections indicating malicious activity, and to generate an alert for the malicious activity.

There is further provided, in accordance with an embodiment of the present invention a computer software product, the product including a non-transitory computer-readable medium, in which program instructions are stored, which instructions, when read by a computer, cause the computer to collect data packets transmitted between multiple entities over a network, to group the packets at least according to their source and destination entities and their times, into connections to which the packets belong, to identify pairs of the connections having identical source and destination entities and times that are together within a specified time window, to generate sets of features for the identified pairs of the connections, to evaluate the features in the pairs in order to detect a given pair of connections indicating malicious activity, and to generate an alert for the malicious activity.

BRIEF DESCRIPTION OF THE DRAWINGS

The disclosure is herein described, by way of example only, with reference to the accompanying drawings, wherein.

DETAILED DESCRIPTION OF EMBODIMENTS

To attack and gain unauthorized access to data in a computer facility, some of the attacks use computer instructions (e.g., a software application or a script) known as shells that can be used to remotely control a computer in the facility. The shell can be used to either execute a malicious application on the compromised computer or to provide a user interface that an attacker can use to control the compromised computer.

One example of an attack is a bind shell attack which moves laterally over a network by opening an interactive command shell on a target computer and connecting to the target computer from a previously compromised computer. In a bind shell attack, an initial connection between two computers is used to either exploit a vulnerability on a first port or to use credentials to access the first port, and a follow-up connection on a second (different) port is used for the interactive shell.

Embodiments of the present invention provide methods and systems for detecting bind shell attacks that can comprise confidential data stored on a corporate network. As described hereinbelow, data packets transmitted between multiple entities over a network are collected, and the packets are grouped at least according to their source and destination entities and their times, into connections to which the packets belong. Pairs of the connections having identical source and destination entities and times that are together within a specified time window are identified, and sets of features are generated for the identified pairs of the connections. The features in the pairs are evaluated in order to detect a given pair of connections indicating malicious activity (e.g., a bind shell attack), and an alert is generated for the malicious activity.

System Description

Figure 1:
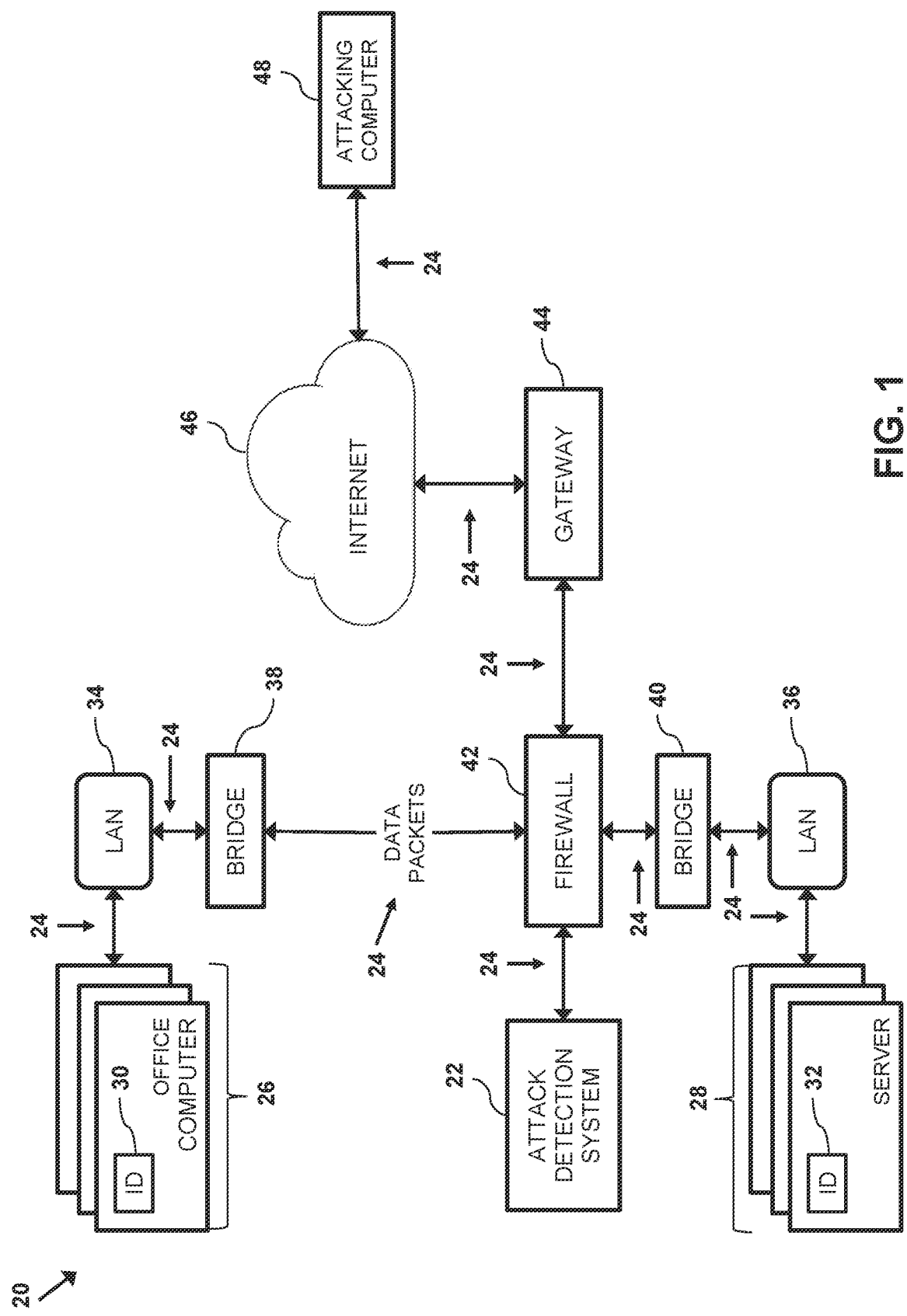
FIG. 1 is a block diagram that schematically shows a computing facility comprising an attack detection system that is configured to detect bind shell attacks, in accordance with an embodiment of the present invention.

FIG. 1 is a block diagram that schematically shows an example of a computing facility 20 comprising an attack detection system 22 that monitors data packets 24 transmitted between networked entities such as office computers 26 and servers 28 in order to identify malicious activity between a given office computer 26 and a given server 28, in accordance with an embodiment of the present invention. Entities such as office computers 26 and servers 28 may also be referred to herein as hosts. While embodiments described herein describe the malicious activity as a bind shell attack, detecting other types of malicious activity in a pair of connections between a source entity and a destination entity is considered to be within the spirit and scope of the present invention.

Each office computer 26 comprises an office computer identifier (ID) 30 that can be used to uniquely identify each of the office computers, and each server 28 comprises a server ID 32 that can be used to uniquely identify each of the servers. Examples of IDs 30 and 32 include, but are not limited to, MAC addresses and IP addresses.

Office computers 26 are coupled to an office local area network (LAN) 34, and servers 28 are coupled to a data center LAN 36. LANs 34 and 36 are coupled to each other via bridges and 40, thereby enabling transmission of data packets between office computers 26 and servers 28. In operation, servers 28 typically store sensitive (e.g., corporate) data.

Computing facility 20 also comprises an internet gateway 44, which couples computing facility 20 to public networks 46 such as the Internet. In embodiments described herein, attack detection system 22 is configured to detect a bind shell attack initiated by a networked entity such as a given office computer 26. In some embodiments, the networked entity may be infected, via the Internet, by an attacking computer 48.

To protect the sensitive data, computing facility 20 may comprises a firewall 42 that controls traffic (i.e., the flow of data packets 24) between LANs 34 and 36 and Internet 46 based on predetermined security rules. For example, firewall can be configured to allow office computers 26 to convey data requests to servers 28, and to block data requests from the servers to the office computers.

While the configuration in FIG. 1 shows attack detection system 22, office computers 26 and servers 28 coupled to LANs 34 and 36, configurations where the attack detection system, the office computers and servers are coupled to (and communicate over) any type of network (e.g., a wide area network or a data cloud) are considered to be within the spirit and scope of the present invention. In some embodiments, some or all of computers 26, servers 28 and attack detection system 22 may be deployed in computing facility 20 as virtual machines.

Embodiments of the present invention describe methods and systems for detecting malicious activity between networked entities that comprise respective central processing units. Examples of the entities include office computers 26, servers 28, bridges 38 and 40, firewall 42 and gateway 44, as shown in FIG. 1. Additional entities that can communicate over networks 34, 36 and 46 include, but are not limited to, personal computers (e.g., laptops), tablet computers, cellular phones, smart televisions, printers, routers and IOT devices.

Additionally, while embodiments here describe attack detection system 22 detecting malicious content transmitted between a given office computer 26 and a given server 28, detecting malicious content transmitted between any pair of the networked entities (e.g., between two office computers 26 or between a given office computer 26 and firewall 42) is considered to be within the spirit and scope of the present invention. Furthermore, while FIG. 1 shows computing facility 20 connected to Internet 46, detecting malicious activity in computing facilities isolated from public networks such as the Internet is considered to be within the spirit and scope if the present invention.

Figure 2:
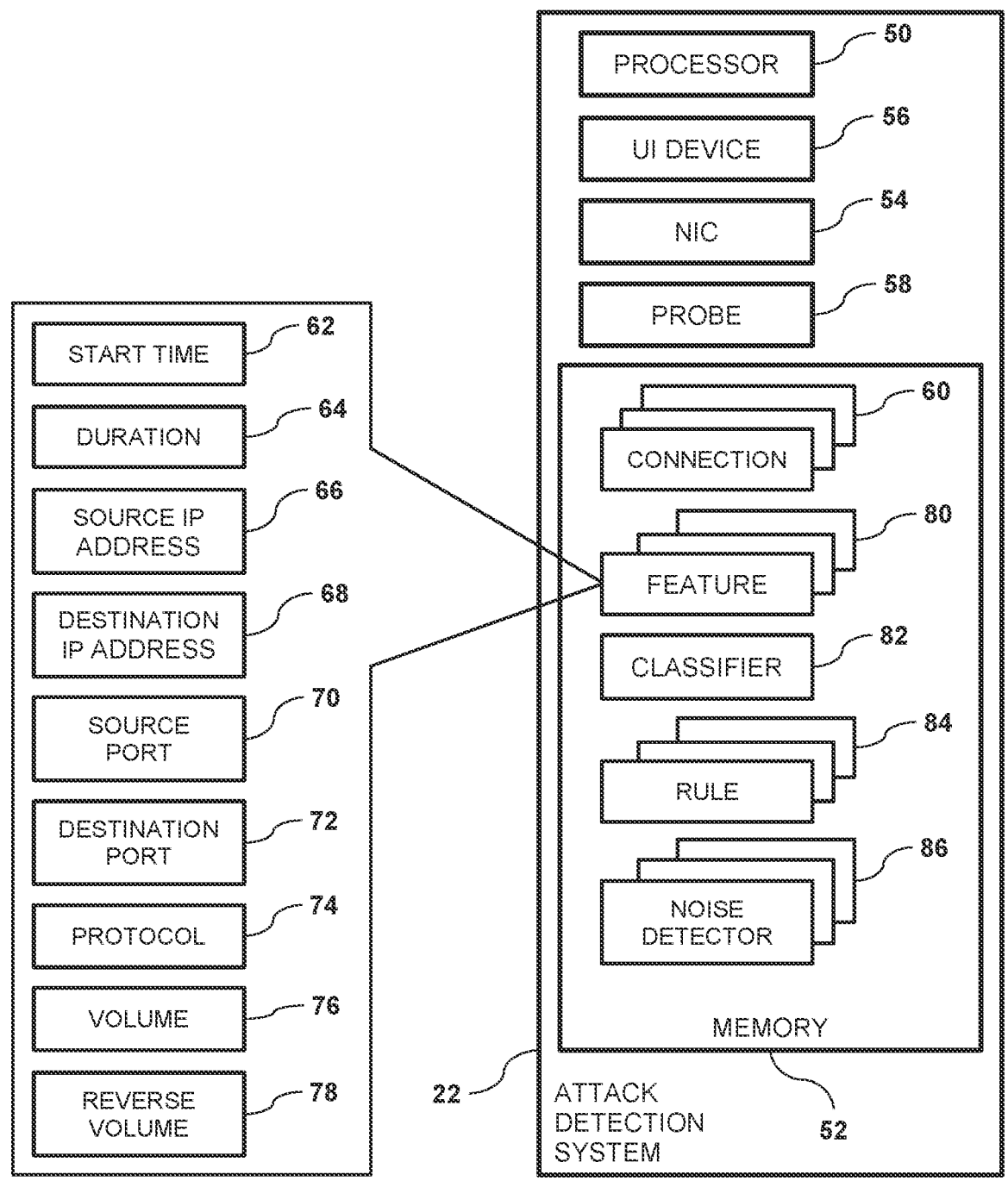
FIG. 2 is a block diagram of the attack detection system, in accordance with an embodiment of the present invention.

FIG. 2 is a block diagram of attack detection system 22, in accordance with an embodiment of the present invention. Attack detection system 22 comprises a detection processor 50 and a memory 52, which are connected by a system bus (not shown) to a network interface controller (NIC) 54 that couples the anomaly detection system to LAN 36. In some embodiments, anomaly detection system 22 may comprise a user interface (UI) device 56 (e.g., an LED display) or another type of output interface. Examples of memory 52 include dynamic random-access memories and non-volatile random-access memories. In some embodiments, memory 52 may include non-volatile storage devices such as hard disk drives and solid-state disk drives.

In the configuration shown in FIG. 2, anomaly detection system 22 comprises a probe 58 that collects information on data packets 24 transmitted over LAN 36. While the example in FIG. 2 shows probe 58 as a module of anomaly detection system 22, the probe may be implemented as either a standalone device coupled to LAN 36 or as a module in another device (e.g., firewall 42) coupled to the data center LAN. Using probe 58 to collect data packets 24 from LAN 36 and processing the collected data packets to extract information is described, for example, in U.S. Patent Application 2014/0165207 to Engel et al. and U.S. Patent Application 2015/0358344 to Mumcuoglu et al., whose disclosures are incorporated herein by reference.

In operation, processor 50 analyzes data packets 24, groups the data packets into connections 60, and stores the connections to memory 52. In embodiments described hereinbelow, processor 50 performs an additional analysis on the data packets in the connections to detect malicious activity in computing facility 20. In alternative embodiments, the tasks of collecting the data packets, grouping the data packets into connections 60, and analyzing the connections to detect the malicious activity may be split among multiple devices within computing facility 20 (e.g., a given office computer 26) or external to the computing facility (e.g., a data cloud based application).

Each connection 60 comprises one or more data packets 24 that are sequentially transmitted from a source entity to a given destination entity. In embodiments described herein, the source entity is also referred to as a given office computer 26, and the destination entity is also referred to herein as a given server 28. In some embodiments, processor 50 may store connections 60 in memory 52 as a first-in-first-out queue. In other embodiments, each connection 60 may comprise one or more data packets that are transmitted (a) from a first given office computer 26 to a second given office computer 26, (b) from a first given server 28 to a second given server 28, or (c) from a given server 28 to a given office computer 26.

In embodiments of the present invention, processor 50 generates a set of features from the data packets in each connection 60. Each given connection 60 comprises the following features 80:

A start time 62. The time that the given connection starts. In some embodiments, start time 62 may be stored using a format "dd.mm.yy hh:mm:ss", where dd indicates a day, mm indicates a month, yy indicates a year, hh indicates an hour, mm indicates a minute, and ss indicates a second.

A duration 64. The duration (e.g., in seconds) of the given connection. In some embodiments an end time of the connection can be computed by adding the duration of the connection to the start time of the connection.

A source IP address 66 (also referred to herein as source or src).

A destination IP address 68 (also referred to herein as destination or dst). The server ID for a given server 28 that is targeted to receive the transmitted data packet(s).

A source port 70. A port number on the office computer used to transmit the data. In some embodiments, source port 70 can be used to identify a software service, executing on a given office computer 26, that typically uses a fixed source port 70 or uses a range of source ports 70.

A destination port 72. A port number on the destination computer that completes the destination address (i.e., an IP address+a port number) for the data packets in the connection. As described hereinbelow, connections 60 can be grouped into pairs of connections 60 that occur in first and second phases (i.e., phase1 and phase2). Port may also be referred to as p1 during the first phase/connection and as p2 during the second phase.

A protocol 74. In operation, processor 50 can perform deep packet inspection to identify, in connections 60, protocols 74 such as Layer3 (e.g., TCP and UDP) and Layer4 (e.g., SSH, Telnet and SOAP).

A volume 76. The amount of raw data (also known as payload) transmitted (i.e., in the data packets in the message) from a given office computer 26 to a given server 28 (i.e., excluding Layer2/Layer3 headers (such as TCP/UDP/Ethernet headers).

A reverse volume 78. The amount of raw data transmitted, during the connection, from a given server 28 to a given office computer 26.

In embodiments described herein, processor 50 groups multiple data packets 24 into a given connection 60. In some embodiments, processor 50 can identify each connection 60 via a 5-tuple comprising a given source IP address 66, a given source port 70, a given destination IP address 68, a given destination port 72 and a given protocol 74.

In one example where the protocol is TCP, the connection starts with a three-way handshake, and ends with either a FIN, an RST or a time-out. Processor 50 can track data packets 24, and construct the entire connection, since all the data packets in the connection are tied to each other with sequence numbers. In another example where the protocol is UDP, then there is no handshake. In this case, processor 50 can group the messages whose data packets 24 have the same 4-tuple comprising a given source IP address 66, a given source port 70, a given destination IP address 68 and a given destination port 72 (i.e., from the first data packet until there is a specified "silence time").

Memory 52 also stores features 80, a classifier 82, rules and noise detectors 86. In operation, processor 50 can generate features 80 from single connections 60 or pairs of the connections (i.e., connections 60 that have identical source IP addresses 66, identical destination addresses 68, and that are transmitted within a specified time window). In one example, a given feature 80 for a single connection 60 may comprise the total data volume (i.e., adding the volumes for all the data packets in the given connection) in the given connection. In another example, a given feature 80 for a pair of connections 60 may comprise a time period between the end of the first connection in the pair and the start of the second connection in the pair. Additional examples of features 80 are described hereinbelow.

In embodiments of the present invention, processor 50 can use features 80, noise detectors 86 and rules 84 for classifier 82 to identify malicious activity (e.g., a bind shell attack) between a given office computer 26 and a given server 28. Examples of noise detectors 86 and rules 84 are described hereinbelow.

Processor 50 comprises a general-purpose central processing unit (CPU) or special-purpose embedded processors, which are programmed in software or firmware to carry out the functions described herein. This software may be downloaded to the computer in electronic form, over a network, for example. Additionally or alternatively, the software may be stored on tangible, non-transitory computer-readable media, such as optical, magnetic, or electronic memory media. Further additionally or alternatively, at least some of the functions of processor 50 may be carried out by hardwired or programmable digital logic circuits.

Malicious Activity Detection

Figure 3:
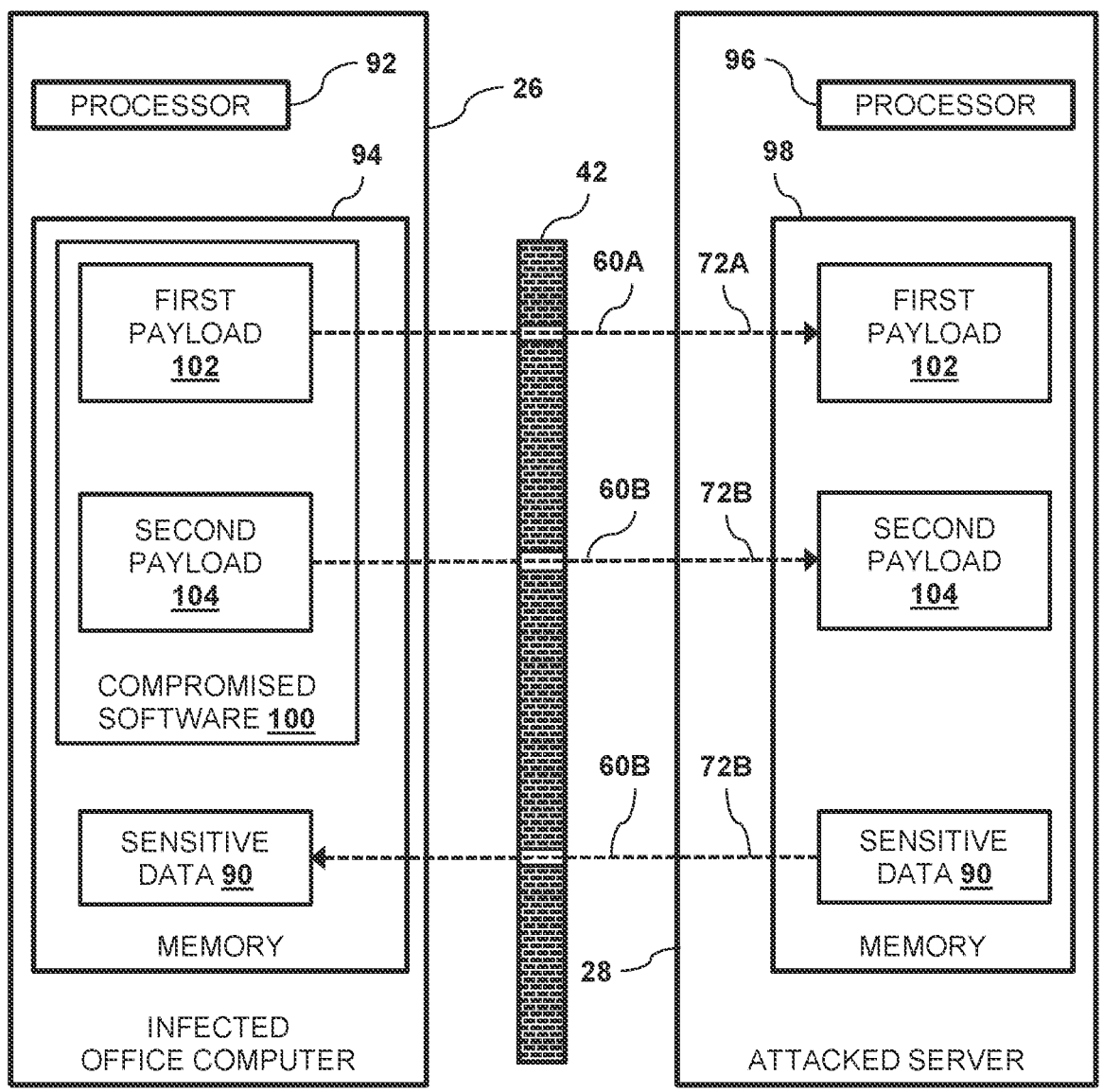
FIG. 3 is a block diagram that schematically shows a flow of software and data during a bind shell attack.

FIG. 3 is a block diagram that schematically illustrates a flow of software and data during an example of bind shell attack, in accordance with an embodiment of the present invention. In this example, a given office computer is infected and a given server 28 storing (or having an ability to access) sensitive data 90 is attacked. The infected office computer comprises a processor 92 and a memory 94, and the attacked server comprises a processor 96 and a memory 98 (e.g., storage devices such as hard disk drives) that stores sensitive data 90.

In the configuration shown in FIG. 3, the bind shell attack starts when a given office computer 26 is infected by loading memory 92 with a compromised software 100 comprising a first payload 102 and a second payload 104. Payloads 102 and 104 comprise respective sequences of computer instructions configured to perform malicious activity.

To infect the given office computer, compromised software 100 (and thereby payloads 102 and 104) can be loaded into memory 94 by a user (not shown) or via the Internet. For example, processor 92 can retrieve compromised software 100 from attacking computer 48 and load the compromised software into memory 94 in response to a user (not shown) pressing on a malicious link in an email.

In FIG. 3, connections 60 and destination ports 72 can be differentiated by appending a letter to the identifying numeral, so that the connections comprise initial connection 60A and subsequent connection 60B, and the destination ports comprise ports 72A and 72B. While executing on processor 92, compromised software 100 starts attacking the given server by conveying, during first connection 60A, first payload 102 via first port 72A (i.e., the destination port used during the first connection in a given pair of connections 60) on the given server. Since first payload 102 is typically small, only a small amount of data is transmitted from the infected office computer to the given server (also referred to herein as the attacked server) during the first connection.

In response to executing first payload 102, processor 96 opens, on the given server, second port 72B (i.e., the destination port used during the second connection in a given pair of connections 60) for inbound connections. In a typical configuration, firewall 42 allows outbound connections from the infected office computer to the attacked server via port 72A (e.g., port "100"), but does not allow outbound connections from the attacked server to either the infected office computer or the Internet.

Opening port 72B enables port 72B to receive larger amounts of data. This enables the compromised software 100 executing on processor 92 to complete attacking the given server by conveying, during subsequent second connection 60B, second payload 104 to the attacked server. Upon completing the attack, compromised software 100 can interact, via the second port, with the attacked server (i.e., via payload 104 executing on processor 96 in order to retrieve (i.e., "steal") sensitive data 90 from the attacked server. In some embodiments payload 104 can be configured to retrieve data 90 and transmit the retrieved sensitive data to the infected office computer via port 72B.

Figure 4:
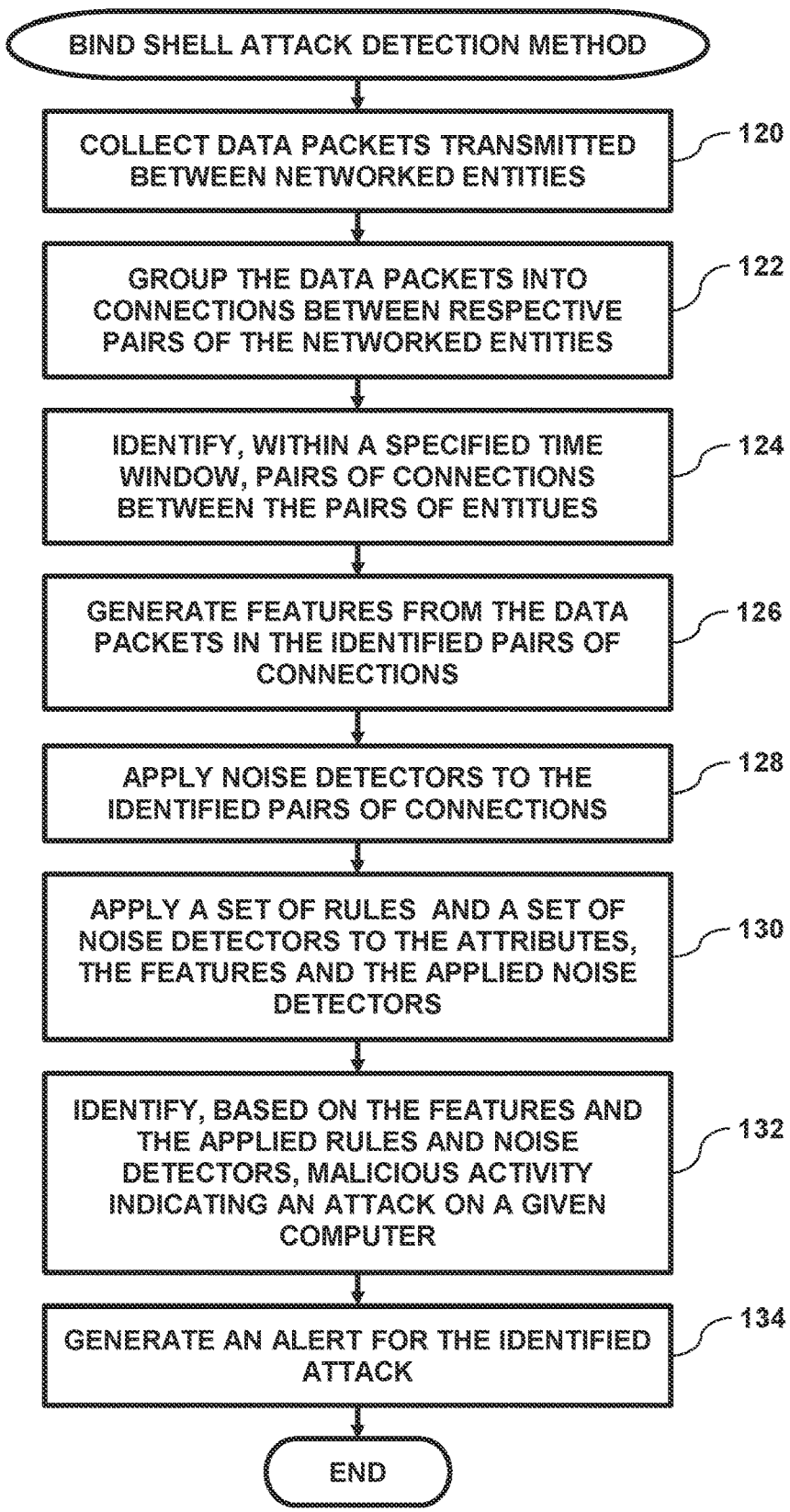
FIG. 4 is a flow diagram that schematically illustrates a method of detecting a bind shell attack, in accordance with an embodiment of the present invention.

FIG. 4 is a flow diagram that schematically illustrates a method for detecting a bind shell attack on computing facility 20, in accordance with an embodiment of the present invention. In embodiments of the present invention, attack detection system 22 can detect a bind shell attack (e.g., the attack described in the description referencing FIG. 3 hereinabove) by analyzing pairs of connections 60 between pairs of source and destination entities in computing facility (for example, a given office computer 26 and a given server 28).

In a collection step 120, processor 50 uses NIC 54 and probe 58 to collect data packets 24 transmitted between the entities coupled to networks 34 and 36 (e.g., office computers 26 and servers 28), and in a grouping step 122, the detection processor groups the collected data packets into connections 60. The following is an example of (a partial list) of raw data collected for connections 60A and 60B:

Connection 60A
Source IP address 66: 10.0.0.1
Destination IP address 68: 10.0.0.2
Source port 70: 1,000
Destination port 72: 100
Start time 62: 15.11.17 11:49:02
Duration 64: 15 sec
Volume (source to destination) 76: 1,024 B Reverse volume 78 (destination to source): 5,454 B
Protocol 74: IMAP
Connection 60B
Source IP address 66: 10.0.0.1
Destination IP address 68: 10.0.0.2
Source port 70: 2,000
Destination port 72: 200
Start time 62: 15.11.17 11:49:22
Duration 64: 500 sec
Volume (source to destination) 76: 10 KB
Reverse Volume 78 (destination to source): 15 KB
Protocol 74: unknown In a first identification step 124, processor 50 identifies pairs of connections 60 that comprise identical source computers (e.g., office computers 26), identical destination computers (e.g., servers 28), and are within a specified time window.

Bind shell attacks typically comprise two consecutive connections 60 between a source (i.e., a given office computer 26) and a destination (i.e., a given server 28), each of the connections using different ports 72 on the destination. In step 124, given a list L of connections 60 between the source and the destination, processor 50 can create a list (not shown) of connection pairs that can be candidates for a bind shell procedure. Processor 50 can then use the following algorithm to identify the connection pairs:

Define d as the maximal time (i.e., the time window) between the start of phase1 and the start of phase2 connections;
init pairs_list=[ ];
for each connection c1 in L;
possible_phase2←all connections c2 in L that have
i. c2.start_time between (c1.start_time, c1.start_time+d)
ii. c2.rvolume>0
add to pairs_list these pairs: [c1, c2i] for each c2i in possible_phase2;

The following is an example table showing a connection pair processed from the raw data described supra:

| Source IP address 66 | 10.0.0.1 |
| Destination IP address 68 | 10.0.0.2 |
| Source port 70 (phase 1) | 1,000 |
| Source port 70 (phase 2) | 2,000 |
| Destination port 72 (phase 1) | 100 |
| Destination port 72 (phase 2) | 200 |
| Start time 62 (phase 1) | 15.11.17 11:49:02 |
| Start time 62 (phase 2) | 15.11.17 11:49:22 |
| Duration 64 (phase 1) | 15 sec |
| Duration 64 (phase 2) | 500 sec |
| Volume 76 (phase 1) | 1,024 B |
| Reverse volume (phase 1) | 5,454 B |
| Volume 76 (phase 2) | 10 KB |
| Reverse volume (phase 2) | 15 KB | where phase1 indicates the first connection in the pair, and phase2 indicates the second connection in the pair.

In a generation step 126, the detection processor generates features 80 from the pairs of connections, and in an application step 128, processor 50 applies a set of noise detectors 86 and in application step 130 processor 50 applies a set of rules 84 to the features in the identified pairs of connections 60.

While monitoring data packets 24, processor 50 may identify large numbers of pairs of connections 60. Noise detectors 86 comprise, for the pairs of connections, sets of features 80 (e.g., destinations 68, ports 72 and protocols 74) that are may be common and/or may have a low probability of being malicious. Examples of noise detectors 86 include, but are not limited to:

NoiseDetector01 (uses dst, p1, p2). This noise detector returns a dataframe of network services comprising destination IP address 68 and destination port 72 used during by the first connection 60 in the pair. These network services can, based on a request, initiate a new session to a specific destination port 72 (phase 2). For example, a function Function01 (dst, p1, p2) can be deployed that, for every destination, computes how many sources accessed that destination with specific p1 and p2. If the function returns a high computed value, this can indicate that the combination (dst, p1, p2) is probably benign since (a) there is a service that is usually accessed by p1 and then by p2, and (b) many sources connect to that destination using that service. Therefore, if Function01 (dst, p1, p2) is high on a specific destination, all the connection pairs with (p1, p2) to that destination can be flagged as probably not being suspicious.

NoiseDetector02 (uses src, p1). This noise detector 86 describes a group having multiple sources that connect to many destinations via a specific p1, and then connect to the destinations via an arbitrary p2. This group can be defined when the source uses a specific p1 and a small NoiseDetector02 number (e.g., greater than 0, greater than 1, greater than 2 or greater than 3) of p2s to connect a to a large NoiseDetector02 number (e.g., greater than 5, greater than 6, greater than 7 greater than 8, greater than 9 or greater than 10) of destinations. This noise detector 86 can flag the connection pairs with these sources as probably not being suspicious when the destination port during phase1 is that specific p1.

NoiseDetector03 (uses src, p2). This noise detector 86 describes sources that connect to many destinations using different p1s and then connect using a specific p2. This group is defined when the source connects to a large NoiseDetector03 number (e.g., greater than 5, greater than 6, greater than 7 greater than 8, greater than 9 or greater than 10) of destinations via a small NoiseDetector03 number (e.g., greater than 0, greater than 1, greater than 2 or greater than 3) of p2s with a specific p1. NoiseDetector03 can flag the connection pairs with these hosts as probably not being suspicious when p2 is the specific p2.

NoiseDetector04 (uses dst, p1). This noise detector 86 describes specific services that result in a second connection 60 using an arbitrary p2. This noise detector is defined when at least one given host 28 (i.e., having a given destination IP address 68) connects to one of the specific services identified by [dst, p1], and the difference between the number of p2s, and distinct destinations connecting to the service is greater than a small NoiseDetector04 threshold (e.g., 2, 3 or 4). This noise detector can flag (i.e., as not being suspicious) the connection pairs that have dst and p1.

NoiseDetector05 (uses p1, p2). If [p1, p2] is a pair of ports 72 that commonly appears in pairs of connections 60, and comes from at least a small NoiseDetector05 number (e.g., 1, 2, 3 or) of sources, then [p1, p2] can be flagged as probably not being suspicious in facility 20 by a given noise detector 86. These pairs may vary for different facilities (i.e., different customers), and are determined using a defined model. This noise detectors can flag (i.e., as not being suspicious) the connection pairs that use these pairs of p1 and p2.

NoiseDetector06 (uses p1, p2). This noise detector 86 describes [src, dst] pairs that communicate with numerous arbitrary (p1,p2) pairs. Anomalous [src, dst] pairs can be flagged as probably not being suspicious using a given noise detector 86.

In the examples of the noise detectors described supra, each of the noise detectors can vote false (i.e., not suspicious) for any pairs of connections 60 that were flagged. Likewise, each of the noise detectors can vote true (i.e., may be suspicious) for any pairs of the connections that were not flagged.

In addition to generating features from the data packets in each connection 60, as described supra, processor 50 can compute additional features 80 for each pair of connections 60 based on the information in the connections (e.g., start time 60 source IP address 66 etc.). Examples of computed features 80 include, but are not limited to:

Start_to_start_time_diff: start time 62 (phase2)−start time 62 (phase 1). In other words, start_to_start_time_diff is the time between the start time of phase1 and the start time of phase2.

End_to_start_time_diff: (start time 62 (phase1)+duration 64 (phase1))−start time 62 (phase 2). In other words, end_to_start_time_diff is the time between the end time of phase1 and the start time of phase2. Note that this result can be negative if phase1 ended before phase 2 started.

Volume_to_rvolume_ratio: volume 76 (phase1)/reverse volume 78 (phase 1).

Path_phase1: A given protocol 74 (e.g., NetBios or TCP) used for phase1.

Path_phase2: A given protocol 74 used for phase2.

Examples of rules 84 include, but are not limited to:

Rule01 (uses duration 64 and volume 76 in phase 2):
False IF duration_phase2<=a small Rule01 value (e.g., 1, 2, 3, 4 or 5 seconds) AND volume_phase2<=a negligible Rule01 value (e.g., 0.01 MB, 0.02 MB, 0.03 MB, 0.04 MB, 0.05 MB or 0.06 MB).
else: True
Rationale: Usually phase2 has a minimal duration 64, since this is the interactive part where the attacker executes command on the destination. Also, if the phase2 contains a payload, the payload will have a minimal reasonable size.

Rule02 (uses volume 76 in phase 1):
True if volume_phase1<=a small Rule02 value (e.g., 1*1024*1024, 2*1024*1024, 3*1024*1024, 4*1024*1024, 5*1024*1024 or 6*1024*1024). Note that the Rule02 values refer to respective numbers of bytes.
else False
Rationale: This indicates a smaller probability for a "standard" communication session since a small volume 76 in phase1 may indicate the use of a small payload/stager, and phase1 is not a standard session.

Rule03 (uses start_to_start_time_diff):
True if start_to_start_time_diff>=a negligible Rule03 value (e.g., 1, 2, 3 or 4) and start_to_start_time_diff<a minimal Rule03 value (e.g., 5, 6, 7, 8 or 9). In other words, Rule03 votes true if start_to_start_time_diff is negligible. Note that the Rule03 values refer to respective numbers of seconds (i.e., time values).
else False
Rationale: The second connection in a bind shell attack is likely to start shortly after the start of the first connection, but not immediately after the first connection.

Rule04 (uses end_to_start_time_diff):
True if end_to_start_time_diff>a negligible Rule04 value that can be positive or negative (e.g., −2, −1, 0 or 1) and end_to_start_time_diff<=a small Rule04 value (e.g., 3, 4, 5, 6, 7 or 8). In other words, Rule04 votes true if end_to_start_time_diff is negligible. Note that the Rule04 values refer to respective numbers of seconds (i.e., time values).
else False
Rationale: Typically, an attacker prefers not to keep the first connection open more than needed since it may be used by others as well. Therefore, in an attack, phase2 typically starts shortly before or shortly after phase1 ends.

Rule05: (uses Path_phase1)
True if Path_phase1 (e.g., NetBios or TCP) is in LIST_OF_REMOTE_CODE_EXECUTION_PROTOCOLS (i.e., a specified set of protocols 74)
Else False
Rationale: In some cases, phase1 is accomplished using a standard protocol that allows remote code execution. Using remote code execution, the source host can remotely open the second port p2 on the destination.

Rule06 (uses Path_phase2):
True if Path_phase2 is unknown
else False
Rationale: Commonly, the protocol used in phase2 is a very simple protocol developed by the attacker. In such cases, the tool used to parse network traffic will not recognize it.

Rule07 (uses Path_phase2):
True if Path_phase2 (e.g., SSH) is in LIST_OF_REMOTE_SESSION_PROTOCOLS (i.e., a specified set of protocols 74)
else False
Rationale: Sometimes, the attacker may use a known protocol 74 for remote sessions as the protocol for phase2.

Rule08:
False if (a count of distinct source IP addresses 66 and destination IP addresses 68 that communicated with the ports P1 and P2 in the network)>a small value (e.g., 3, 4, 5, 6 or 7).
Else True
Rationale: If [p1, p2] is a couple that appears a lot in the network (i.e., from many source IP addresses 66 and to many destination IP addresses 68), then the [p1, p2] couple indicates a lower probability of an attack.

Rule09 (Function01 is described supra):
False if Function01 (dst, p1, p2)>a high value (e.g., 3, 4, 5, or 6).
Else True
Rationale: If a first given connection 60 to a given destination IP address 68 via P1 is commonly followed by a second given connection 60 to the given destination IP address via a different port 60, than the pair of the first and the second given connections is more likely to be normal activity and not a bind shell attack.

As described supra processor 50 extracts respective sets of attributes for identified pairs of connections 60, and compares the extracted sets of attributes to previously identified sets of attributes found to categorize any pairs of the connections as suspicious. In some embodiments, processor 50 can extract and compare the attributes by calculating the noise detectors, extracting the features, calculating the rules, and applying the model, as described respectively in steps 126, 128 and 130.

In some embodiments, rules 84 can be categorized into groups based on one or more subjects covered by the rules. As described hereinbelow, processor 50 can use a number of rules that are true for a given group as a parameter for detecting bind shell attacks. Examples of groups include:

Rules 84 relating to timing. These rules can use start times 62 and durations 64 in the pair of connections. Examples of rules 84 in the timing group include Rule01, Rule03 and Rule04 described supra.

Rules related to flow (i.e., protocols 72 and ports 74) in the pair of connections. Examples of rules 84 in the protocol group include Phase1_protocl, Rule06 and Rule07 described supra.

Rules related to noise detectors 86. Examples of rules 84 in the noise detector group include Rule08 and Rule09 described supra.

Rules relating to traffic features such as volume, reverse volume and duration of the first and second phases. Examples of rules in this group include Rule01 and Rule02 described supra.

In some embodiments, a given feature 80 may be based on a given group of rules 84. For example, a given feature 80 may comprise a number of rules 84 in the timing group that vote "true". Another example of a given feature 80 based on multiple rules 84 comprises a number of all rules 84 that vote true.

In a second identification step 132, processor 50 identifies, based on features 80, noise detectors 86 and results from rules 84, malicious activity in a given pair of connections 60 that indicates a bind shell attack on a given network entity such as a given server 28. In addition to using the rules and the noise detectors as described hereinbelow, processor 50 can evaluate features 80 by determining a baseline of the features for normally observed traffic, comparing the features in the pairs of connections to the baseline of the features and suspecting malicious activity if the features in a given pair of connections 60 deviate from the baseline.

In one embodiment, processor 50 can evaluate features by analyzing combinations of features 80. In another embodiment, processor 50 can evaluate features 50 by applying rules 84 and noise detectors 86, and comparing respective numbers of the rules and the noise detectors that vote true against a predetermined threshold. In an additional embodiment, a given rule 84 voting true or a given feature having a specific value (e.g., a specific destination port 72) may indicate malicious activity. In a further embodiment, a number of rules 84 in a given category voting true can be used as a parameter in identifying malicious activity.

In one specific embodiment, processor 50 can identify a set destination ports 72 that are commonly seen in connections 60, and the detection processor can suspect malicious activity if it detects a pair of connections 60 that use a "new" (or rarely used) destination port 72. In another embodiment, processor 59 can flag a given pair of connections 60 as suspicious if the destination ports in the first and the second connections in the pair are different.

Finally in an alert step 134, processor 50 generates an alert (e.g., on user interface device 56) indicating the bind shell attack on the given networked entity, and the method ends. For example, processor 50 can generate the alert by presenting, on user interface device 56, a message indicating an attack on a given server 28 via a given office computer 26, and a type of the attack (e.g., bind shell).

While embodiments herein describe processor 50 performing steps 120-134 described supra, other configurations are considered to be within the spirit and scope of the present invention. For example, probe 58 may comprise a stand-alone unit that collects data packets 24, as described in step 120, and remaining steps 122-134 can be performed by any combination of processor 50, any other processors in computing facility 20, or a data cloud (not shown).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    collecting data packets transmitted between multiple entities over a network;
    grouping the packets at least according to their source and destination entities and their times, into connections to which the packets belong;
    identifying pairs of the connections having identical source and destination entities and times that are together within a specified time window, wherein each given pair of connections comprises first and second connections;
    generating sets of features comprising port numbers from header information in the packets of the identified pairs of the connections, each set of features for a given pair comprising first features of the first connection in the given pair and second features of the second connection in the given pair;
    evaluating, by a processor, the features in the pairs, including the port numbers, in order to detect at least one pair of the connections whose first and second features differ, thereby indicating a bind shell attack; and
    generating an alert for the bind shell attack.

2. The method according to claim 1, wherein detecting the bind shell attack comprises detecting that the port number on the destination entity in the first connection in the given pair of connections is different than the port number on the destination entity in the second connection in the given pair of connections.

3. The method according to claim 1, and comprising generating additional sets of features from respective Internet Protocol (IP) addresses in the identified pairs of the connections, and wherein evaluating the features comprises evaluating the additional sets of features.

4. The method according to claim 3, wherein detecting the bind shell attack comprises detecting that the IP address of the destination entity in the given pair does not match a specified IP address and detecting that the port number on the given destination entity in the first connection in the given pair does not match a specified port number.

5. The method according to claim 3, wherein detecting the bind shell attack comprises detecting that the given IP address of the destination entity in the given pair does not match a specified IP address and detecting that the port number on the given destination entity in the second connection in the given pair does not match a specified port number.

6. The method according to claim 1, wherein a given feature comprises an Internet Protocol (IP) address of a given entity in a given connection.

7. The method according to claim 1, wherein a given feature comprises a protocol of a given connection.

8. The method according to claim 7, wherein detecting the bind shell attack comprises detecting that the protocol used in a given connection in the given pair of connections is either unknown or is in a specified set of protocols.

9. A method, comprising:
collecting data packets transmitted between multiple entities over a network;
grouping the packets at least according to their source and destination entities and their times, into connections to which the packets belong;
identifying pairs of the connections having identical source and destination entities and times that are together within a specified time window, wherein each given pair of connections comprises first and second connections;
generating sets of features from header information in the packets of the identified pairs of the connections, each set of features for a given pair comprising first features of the first connection in the given pair and second features of the second connection in the given pair;
evaluating, by a processor, the features in the pairs in order to detect at least one pair of the connections whose first and second features differ, thereby indicating a bind shell attack; and
generating an alert for the bind shell attack,
wherein evaluating the features comprises determining a baseline of the features, and comparing the features in the pairs of connections to the baseline of the features.

10. A computer software product, the product comprising a non-transitory computer-readable medium, in which program instructions are stored, which instructions, when read by a computer, cause the computer:
to collect data packets transmitted between multiple entities over a network;
to group the packets at least according to their source and destination entities and their times, into connections to which the packets belong;
to identify pairs of the connections having identical source and destination entities and times that are together within a specified time window, wherein each given pair of connections comprises first and second connections;
to generate sets of features comprising port numbers from header information in the packets of the identified pairs of the connections, each set of features for a given pair comprising first features of the first connection in the given pair and second features of the second connection in the given pair;
to evaluate by a processor, the features in the pairs, including the port numbers, in order to detect at least one pair of the connections whose first and second features differ, thereby indicating a bind shell attack; and
to generate an alert for the bind shell attack.

11. A method, comprising:
collecting data packets transmitted between multiple entities over a network;
grouping the packets at least according to their source and destination entities and their times, into connections to which the packets belong;
identifying pairs of the connections having identical source and destination entities and times that are together within a specified time window, wherein each given pair of connections comprises first and second connections;
identifying respective start and end times of the first and second connections in the identified pairs;
comparing, by a processor, the end time of the first connection in a given pair to the start time of the second connection in the given pair in order to detect a bind shell attack; and
generating an alert for the bind shell attack.

12. The method according to claim 11, wherein an additional feature comprises a difference between the start times of the first and the second connections.

13. The method according to claim 12 wherein detecting the bind shell attack comprises detecting that the difference between the start times of the first and the second connections is within a specified range.

14. The method according to claim 11, wherein detecting the bind shell attack comprises detecting that the difference between the end time of the first connection and the start time of the second connection is greater than a specified value that can be positive or negative.

15. The method according to claim 11, wherein a given feature comprises a duration of a given connection.

16. The method according to claim 15, and comprising generating additional sets of features from volumes of the identified pairs of the connections, and wherein evaluating the features comprises evaluating the additional features.

17. The method according to claim 16, wherein detecting the bind shell attack comprises detecting that the duration of the second connection is greater than or equal to a specified duration and detecting that the volume of data transmitted in the second connection is greater than or equal to a specified value.

18. A method, comprising:
collecting data packets transmitted between multiple entities over a network;
grouping the packets at least according to their source and destination entities and their times, into connections to which the packets belong;
identifying pairs of the connections having identical source and destination entities and times that are together within a specified time window, wherein each given pair of connections comprises first and second connections;
generating sets of features from respective reverse volumes in the identified pairs of the connections;
evaluating, by a processor, the features in the pairs in order to detect a given pair of connections indicating a bind shell attack; and
generating an alert for the bind shell attack.

19. The method according to claim 18, wherein a given feature for a given pair of connections comprises the volume of data transmitted from the source entity to the destination entity during the first connection divided by the volume of data transmitted from the destination entity to the source entity during the first connection.

20. The method according to claim 18, wherein detecting the bind shell attack comprises detecting that the volume of data transmitted in the first connection in the given pair is less than a specified value.

* * * * *